US006577956B1

(12) United States Patent
Shams

(10) Patent No.: US 6,577,956 B1
(45) Date of Patent: Jun. 10, 2003

(54) AUTOMATED DNA ARRAY IMAGE SEGMENTATION AND ANALYSIS

(75) Inventor: Soheil Shams, Los Angeles, CA (US)

(73) Assignee: Biodiscovery, Inc., Marina, CA (US)

( * ) Notice: Subject to any disclaimer, the term of this patent is extended or adjusted under 35 U.S.C. 154(b) by 0 days.

(21) Appl. No.: 09/591,915

(22) Filed: Jun. 9, 2000

Related U.S. Application Data

(62) Division of application No. 09/020,155, filed on Feb. 7, 1998.

(51) Int. Cl.[7] .......................... G01N 33/48; C12Q 1/68; G06F 17/30; G06F 17/00
(52) U.S. Cl. ................... 702/19; 435/6; 707/3; 707/104
(58) Field of Search ....................... 707/3, 104; 702/19; 435/6

(56) References Cited

U.S. PATENT DOCUMENTS

| 4,550,084 A | 10/1985 | Nelson et al. |
| 4,641,528 A | 2/1987 | Claylang, Jr. et al. |
| 5,121,320 A | 6/1992 | Aoki et al. |
| 5,273,632 A | 12/1993 | Stockham et al. |
| 5,389,792 A | 2/1995 | DiMarzio et al. |
| 5,417,923 A | 5/1995 | Bojanic et al. |
| 5,541,064 A | 7/1996 | Bacus et al. |
| 5,560,811 A | 10/1996 | Briggs et al. |
| 5,580,728 A | 12/1996 | Perlin |
| 5,583,973 A | 12/1996 | DeLisi et al. |
| 5,680,514 A | 10/1997 | Shams |
| 5,695,937 A | 12/1997 | Kinzler et al. |
| 5,757,954 A | 5/1998 | Kuan et al. |
| 5,837,475 A | 11/1998 | Dorsel et al. |
| 5,851,769 A | 12/1998 | Gray et al. |
| 5,853,979 A | 12/1998 | Green et al. |
| 5,865,975 A | 2/1999 | Bishop |
| 5,876,933 A | 3/1999 | Perlin |
| 5,916,747 A | 6/1999 | Glichrist et al. |
| 5,945,284 A | 8/1999 | Livak et al. |
| 5,945,679 A | 8/1999 | Dorsel et al. |
| 5,981,190 A | 11/1999 | Israel |
| 6,308,170 B1 * | 10/2001 | Balaban .................. 707/3 |

OTHER PUBLICATIONS

Recognition of Visual Object Classes, M. Burl, JPL, V–0105, Mar. 30, 1996.
Extraction of heart and vessel walls on ultrasound images using Snake–Splines, M. Taine and A. Herment, SPIE vol. 2434, 3/95.
Vehicle Segmentation and Classification Using Deformable Templates, M. Jolly, S. Lakshmanan & A. Jain, IEEE v. 18, No. 3, 3/96.
Graphical Templates for Model Registration, Y. Amit and A. Kong, IEEE v. 18, No. 3, 3/96.
Encoding of a priori information in active contour models, B. Olstad and A. Trop, IEEE v. 18, No. 9, 9/96.
A class of constrained clustering algorithms for object boundary extraction, A. Abrantes and J. Marques IEEE v. 5, No. 11, 11/96.
Object matching using deformable templates, A. Jain, Y. Zhong and S. Lakshmanan, IEEE v. 18, No. 3, 3/96.
Snakes: Active Contour Models, M. Kass, A. Witkin and D. Terzopoulos, International Journal of Computer Vision, 321–331, 1998.
Multiple elastic modules for visual pattern recognition, S. Shams, Neural Networks, v. 8, No. 9, pp. 1439–1456, 1995.
Straight–Line detection on a gated–connection VLSI network, D. Shu, J. Nash, M. Eshaghian & K. Kim, P IEEE Comp. Soc., 6/90.
Translation–, Rotation–, Scale & Distortion–Invariant Object Recognition Through Self–Organization, S. Shams, Int'l Journal of Neural Systems, v. 8, No. 2, 4/97.

* cited by examiner

Primary Examiner—Kenneth R. Horlick
Assistant Examiner—Young Kim
(74) Attorney, Agent, or Firm—William C. Cray

(57) ABSTRACT

A segmentation method of a frame of image information including a plurality of spaced DNA spot images corresponding to a plurality of DNA spots. The image information includes image intensity level information corresponding to said DNA spots. The frame is stored in a memory device and a set of image information within said frame including a selected set of the DNA spot images is selected. A grid including a plurality of spaced grid points corresponding to said selected DNA spot images is generated, such that each grid point includes position information indicating the position of the grid point within said frame. The current position of one or more grid points are adjusted by: selecting a first bounding area in the frame around the current position of the grid point; generating a first position update including position information for updating a current position of said grid point to a first new position within the first bounding area, the location of said first new position relative to said current position being a function of intensity level of at least a portion of the image within the first bounding area; generating a second position update including position information for updating said current position to a second new position in the frame, said second new position being in a geometric arrangement with the position of grid points around said grid point; and updating said current position with the position information of the first and the second position updates, thereby shifting said grid point toward the corresponding spot image. A display method displays image information corresponding to a plurality of DNA spot images of at least one DNA spot, the image information including image characteristic values including background and signal intensity levels. For each DNA spot image: (1) background and signal intensity levels are extracted from the image characteristic values for the spot image, and (2) difference values between the background intensity levels and signal intensity levels are determined. For each DNA spot: (1) the corresponding difference values are related a range of graphic values, (2) a graphic value for each difference value is selected; and (3) the selected graphic values are displayed.

69 Claims, 9 Drawing Sheets

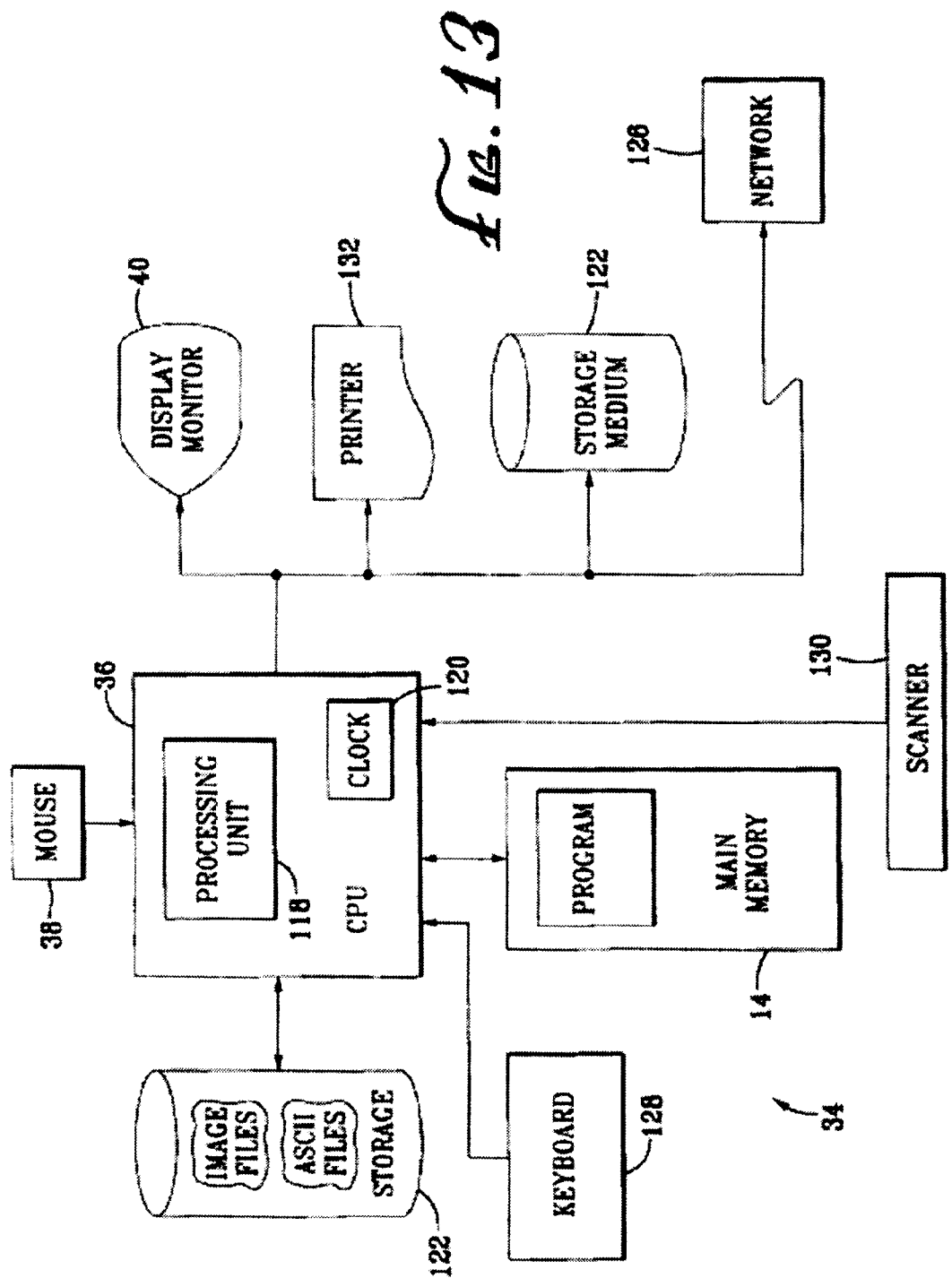

AUTOMATED DNA ARRAY IMAGE SEGMENTATION AND ANALYSIS

This is a divisional application of application Ser. No. 09/020,155, filed Feb. 7, 1998, now pending.

FIELD OF THE INVENTION

The present invention relates to DNA array image analysis, and, in particular, to automatically segmenting DNA array images into individual DNA spot images for quantification.

BACKGROUND

Cellular behavior is primarily dictated by the selective expression of a subset of genes. Normal growth and differentiation depends on the appropriate genes being expressed in a desired context. Various disease states alter the normal expression of genes as compared to normal tissue. For example, malignant transformation of cancer tissues involves or induces altered gene expression. Through signal transduction cascades and transcriptional networks, alterations of one gene can impact a large number of genes and result in global effects on cell behavior. Regulation of translation and post-transcriptional modification play significant roles, but, invariably, signal transduction pathways lead to the nucleus and changes in gene transcription.

Therefore, there has been enormous interest in the development of techniques that allow the analysis of differential gene expression between different tissues or cell lines. One such technique includes use of ordered micro-arrays that allow two color fluorescence detection of hybridization signals. Individual DNA targets are arrayed on a small glass surface and hybridized with fluorescently labeled heterogeneous DNA probes derived from cDNA. The amount of fluorescence at each DNA spot correlates with the abundance of that DNA fragment in the probe mixture.

Using micro-arrays, gene expression levels can be quantitated at up to thousands of genes simultaneously. As hundreds of the same array can be printed, numerous tissues can be easily analyzed for relative expression levels. As such, the technique provides a powerful new tool for analyzing differential gene expression in numerous biologic problems. In addition to the determination of gene expression differences between tissues, genomic micro-arrays are useful for genomic mapping, genomic ploidy measurements and as hybridization targets for genomic mismatch scanning. Such techniques require rapid quantitative analysis of fluorescent hybridization for hundreds to tens of thousands of DNA spots. As such, there is a severe bottleneck in gene expression data collection due to inadequate methods for processing of individual DNA spot images for determining the quantitative fluorescent hybridization levels.

Some existing methods include manual processing of DNA spot images using a generic image processing tool, such as NIH image. Using such a tool a user visually locates each DNA spot image in a micro-array image, and moves a display pointer to each spot image, and manually defines a small area around the spot image. The image processing tool then reports image intensity values within the small area. The user then manually records the intensity values and continues this process for other visually located DNA spot images in the micro-array image.

However, such manual methods are impractical for microarrays with more than a handful of spot images. Further such methods are tedious and repetitive, requiring considerable time and effort. For example, with a micro-array image having about 600 DNA image spots, such manual methods can take about 8 hours of work, and resulting in quantification of only a limited number of image spots which visually seem to have a "good" expression level. As the micro-array density increases and becomes more complex, use of such methods becomes even more prohibitive. For example, current micro-array sizes range from several hundred to 1,200 genes, arrayed in a 1.8×1.8 cm area. As tip fabrication has improved, arrays with greater than 50,000 genes are viable. Such methods are also prone to various errors, including errors in manually recording the intensity values. Further such methods provide inconsistent quantification of intensity values, both for different spot images measured by a single individual, and for multiple individuals making measurements from the same micro-array image.

To alleviate the shortcomings of manual methods, some existing methods automate the process of locating DNA spot images from micro-array images and quantifying corresponding expression values. Such methods utilize a computer to manually position a cell grid on an area of the micro-array image containing an array of DNA spot images. The grid can be resized and individual columns and rows of the grid can be manually adjusted to better fit the arrayed pattern of DNA spot images. The grid position is then used by the computer to quantify the expression values using the intensity levels at each cell in the grid. However, such methods are inflexible since the grid placement requires extensive user interaction to fine-tune the grid. Further, the grid used in such methods is either completely fixed in shape, or has limited global flexibility (e.g., resizing and rotating the entire grid).

Such limitations cause a major handicap in most DNA array image analysis applications since DNA spots are never perfectly formed in a regular grid pattern in a micro-array such as shown in FIG. 1. Although a robot used in spotting DNA fragments on a glass surface has positional accuracy to within +/−5 um, larger variations in the precise spacing of the arrayed DNA spots occur due to surface interactions of the solution with the silanized surface and tip variations. Moreover, printing tips are difficult to fabricate and many do not work uniformly. Therefore, as shown in FIG. 2, not only are DNA spots occasionally placed out of the regular grid pattern, but they also vary in size. It is therefore rare to have a fixed grid that can match exactly the pattern in the micro-array. Though in existing methods the grid can be manually resized, rotated, and a column or a row of the grid can be moved, the individual grid cells cannot be manipulated Therefore, such methods are impractical for most DNA array image analysis applications, and specially for high density micro-arrays Further, DNA spot image signals derived from the microarrays are susceptible to surface noise and laser reflection, due to surface dust. And, nonspecific DNA binding to the silanized surface occurs in a non-uniform pattern creating a varying background of fluorescence over the surface. Existing methods are unable to cope with irregular micro-array pattern, search for DNA image spots, and accurately quantify specific signals while accounting for the local background.

Other existing methods do not use a grid at all but apply a "spot" filter to detect locations in the micro-array image which "look-like" DNA spot images. However, using such methods it is difficult to define what a spot should look like. Furthermore, extensive noise and variations in the spot shape, due to the processing and scanning mechanisms, significantly reduce the signal to- noise ratio (SNR) of the spot images. Thus, the detection scheme misses many real spots and processes many false patches in the image as real DNA spot images.

Another disadvantage of existing systems is their inability to display micro-array image pixel intensities, corresponding to gene expression values in related DNA spots for example, in an intuitive manner. As such, the user cannot easily determine gene properties in such DNA spots.

There is, therefore, a need for a DNA array image analysis method for automatically segmenting DNA array images into individual DNA spot images for quantification. There is also a need for such method to process irregular micro-array patterns, search for DNA image spots, and accurately quantify, and intuitively display, specific signals while accounting for the local background.

SUMMARY

The present invention satisfies these needs. In one embodiment, the present invention provides a method for segmentation of a frame of image information including a plurality of spaced DNA spot images corresponding to a plurality of DNA spots, the image information including image intensity level and intra frame position information corresponding to said DNA spots. The method of the present invention comprises the steps of: (a) transferring the frame of image information into a memory device; (b) selecting a set of image information within said frame including a selected set of the DNA spot images; (c) generating a grid in said memory device, the grid including a plurality of spaced grid points corresponding to said selected DNA spot images, each grid point including position information indicating the position of the grid point within said frame; and (d) modifying a current position of at least one grid point corresponding to a spot image to shift the grid point toward the corresponding spot image. Step (d) can be repeated for said grid point and for all the grid points of the grid.

The step of modifying said current position includes: (i) selecting a first bounding area in the frame around the current position of the grid point; (ii) generating a first position update including position information for updating a current position of said grid point to a first new position within the first bounding area, the location of said first new position relative to said current position being a function of intensity level of at least a portion of the image within the first bounding area; (iii) generating a second position update including position information for updating said current position to a second new position in the frame, said second new position being in a geometric arrangement with the position of one or more grid points around said grid point; and (iv) updating said current position with the position information of the first and the second position updates, thereby shifting said grid point toward the corresponding spot image. The DNA spot images can be in a substantially two dimensional array arrangement, and generating the grid can include generating a two dimensional array of grid points spaced according to a predetermined criteria.

The method can further include the step of segmenting the selected set of image information by selecting at least one image segment defining a segment area around a grid point and including a spot image with minimum distance from said grid point, said segment area being a function of the spacing between said grid point and one or more neighboring grid points. The selected set of image information can further be segmented into a plurality of image segments corresponding to the plurality of grid points in the grid, each image segment defining a segment area around a corresponding grid point and including a corresponding spot image with minimum distance from said grid point, said segment area being a function of the spacing between said grid point and one or more neighboring grid points, wherein each spot image is contained in a corresponding image segment.

The method of the present invention can further include quantifying at least a portion of image information in said image segment to obtain image characteristic values for said image segment. The image characteristic values can include DNA information for a DNA spot corresponding to the DNA spot image in said image segment, said DNA information including gene expression values.

In another aspect, the present invention provides a method of displaying image information corresponding to a plurality of DNA spot images of at least one DNA spot, the image information including image characteristic values including background and signal intensity levels. In one embodiment, the display method includes the steps of: (a) for each DNA spot image: (1) extracting said background and signal intensity levels from the image characteristic values for the spot image, and (2) determining difference values between the background intensity levels and signal intensity levels; and (b) for each DNA spot: (1) relating the corresponding difference values to a range of graphic values, (2) selecting a graphic value for each difference value, and (3) displaying the selected graphic values. The steps of relating and selecting can include associating each difference value to a segment of a pie chart having multiple segments, and the step of displaying the selected graphic values can include displaying said segments as a pie chart. The area of each segment of each pie chart can be a function of the magnitude of the associated difference value.

In another aspect, the present invention provides a software system for configuring a computer system comprising a processor, and a memory device, to perform the steps of the methods of the present invention described above. The present invention also provides a computer system including means for performing the steps of the method of the present invention.

As such, the present invention provides a method, software system and computer system for automatically deforming a grid to locate individual DNA spot images and to quantify the spot images for measuring the local signal and background intensity values for the spot images, and to display such values. The method and software system of the present invention automate data quantification and extraction in DNA array image analysis applications.

BRIEF DESCRIPTION OF THE DRAWINGS

These and other features, aspects and advantages of the present invention will become better understood with regard to the following description, appended claims and accompanying drawings where:

FIG. 3a illustrates the steps of an embodiment of a DNA array image analysis according the present invention;

FIG. 3b illustrates the steps of an embodiment of adjusting the position of a grid point in the method of FIG. 3a;

FIG. 4 is a graphic representation of a grid with uniform spacing used to locate DNA spots in a typical example micro-array according to the method of FIG. 3a;

FIG. 7 is a graphic illustration of segmenting a frame of image information including DNA images spots according to the method of FIG. 3a;

FIG. 8 illustrates an example flow diagram for program instructions for implementing the DNA array image analysis method of FIG. 3a;

FIG. 13 is an example block diagram of a computer system for implementing the present invention.

DESCRIPTION

Figure 1:
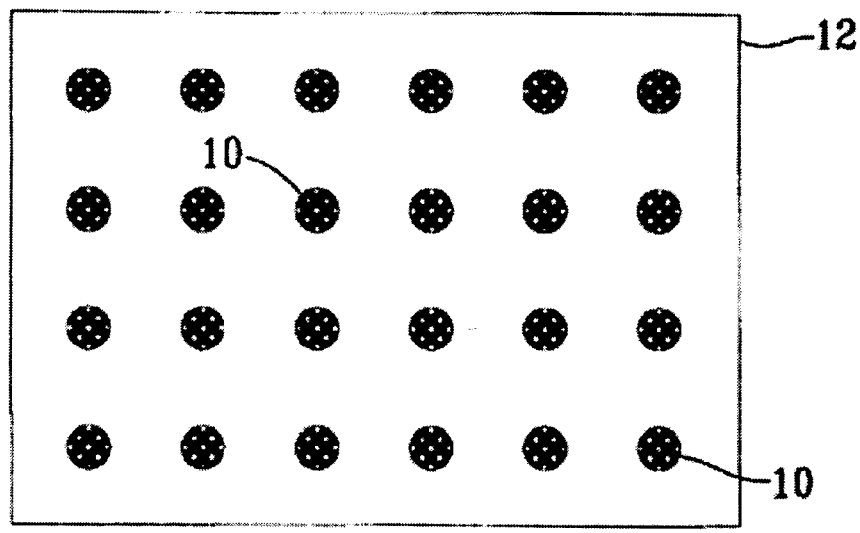
FIG. 1 is a graphic representation of a frame of image information including DNA images spots corresponding to an ideal micro-array of DNA spots.
Figure 2:
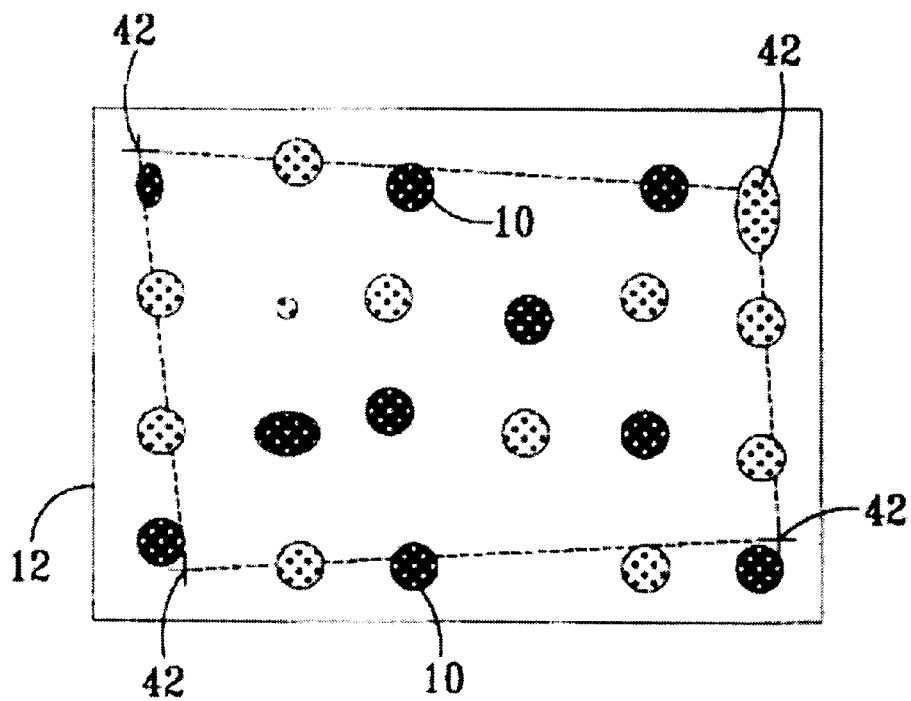
FIG. 2 is a graphic representation of a frame of image information including DNA images spots corresponding to a typical micro-array of DNA spots.

In one embodiment, the present invention provides a method for automatically locating an array of DNA spot images 10 within a scanned image frame 12 of a DNA micro-array or a DNA macro-array, shown in FIGS. 1 and 2, wherein each spot corresponds to a particular gene or gene fragment. The method of the present invention is applicable to both high-density micro-arrays, where spots are closely packed together on a solid surface, such as glass, with several thousands of spots placed in about 1 cm square area, and to macro-arrays with larger spacing of spots on surfaces such as membrane surfaces.

FIG. 2 is a graphic representation of the frame 12 of image information for a micro-array of DNA spots, including the DNA spot images 10. Typically, the image frame 12 is generated by scanning a micro-array with a particular laser frequency. The spot images 10 are not in perfect alignment to each other, and there are large fluctuations in intensity, shape, and size of each spot in the micro-array. The image information includes intensity levels for the spots corresponding to the level of expression of a particular gene.

Referring to Figure a, an embodiment of the method of the present invention comprises the steps of: (a) storing the frame 12 of image information in a memory device 14 (step 16); (b) selecting a set 18 of image information within said frame 12 including a selected set of the DNA spot images 10 (step 20); (c) generating a grid 22 in said memory device 14, the grid 22 including a plurality of spaced grid points 24 corresponding to said selected DNA spot images 10, each grid point 24 including position information indicating the position of the grid point within said frame 12 (step 26); and (d) modifying a current position of at least one grid point 24 corresponding to a spot image 10 to shift the grid point 24 toward the corresponding spot image 10 (step 28). Step 28 can be repeated for said grid point 24 and for all the grid points 24 of the grid 22.

The method of the present invention can be implemented as program instructions for configuring a computer system 34, further described below, to perform the steps of the method of the present invention described herein. The computer system 34 includes a processor 36, the memory device 14, an input device 38 and a display 40. Using the computer 34, a user selects an image file containing the image frame 12 (control image) for processing, stores the image frame 12 in the memory 14 and displays it on the display 40 as the control image 12. The control image 12 includes a plurality of pixels each having an intensity level and a position within the control image 12. The user then selects an image region 18 in the control image 12 by defining approximate four corners 42 of the image region 18 using the input device 38. If not all corners 42 are visible, due to lack of DNA product at a particular location, the user can guess at a rough placement for a missing corner. Anchor spots can be used depending on the experiment to guarantee that all corners are visible.

Figure 4:
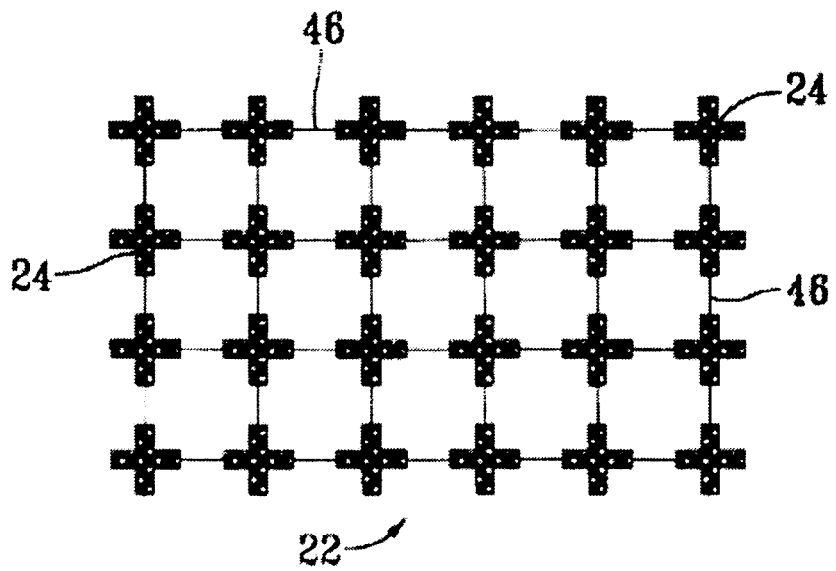

The user then specifies the number of columns, C, and rows, R, of arrayed image spots 10 in the selected region 18. The computer 34 then automatically generates the grid 22 with equal spacing between each pair of corners having R rows and C columns within the specified region 18. The grid 22 comprises R×C grid points 24, one grid point 24 for each intersection of a row with a column. Each gird point 24 in the grid 22, except for those along the edges of the grid 22, is displayed as connected to its four neighbors to the right, let, up, and down, through an elastic connection 46. This placement of the grid points 24 establishes the starting configuration of the dynamic grid 22 as shown in FIG. 4. The grid 22 can be represented in the memory 14 using two matrices: (i) a first matrix comprising an adjacency matrix of size R×C×4 where each row number refers to a particular intersection point in the grid 22 and each column number refers to the neighboring intersection points arranged in a North, West, South, East fashion, and (ii) a second matrix comprising a position matrix of size R×C×2 specifying the absolute location of each grid point 24 in the control image 12.

Figures 3A, 3B:
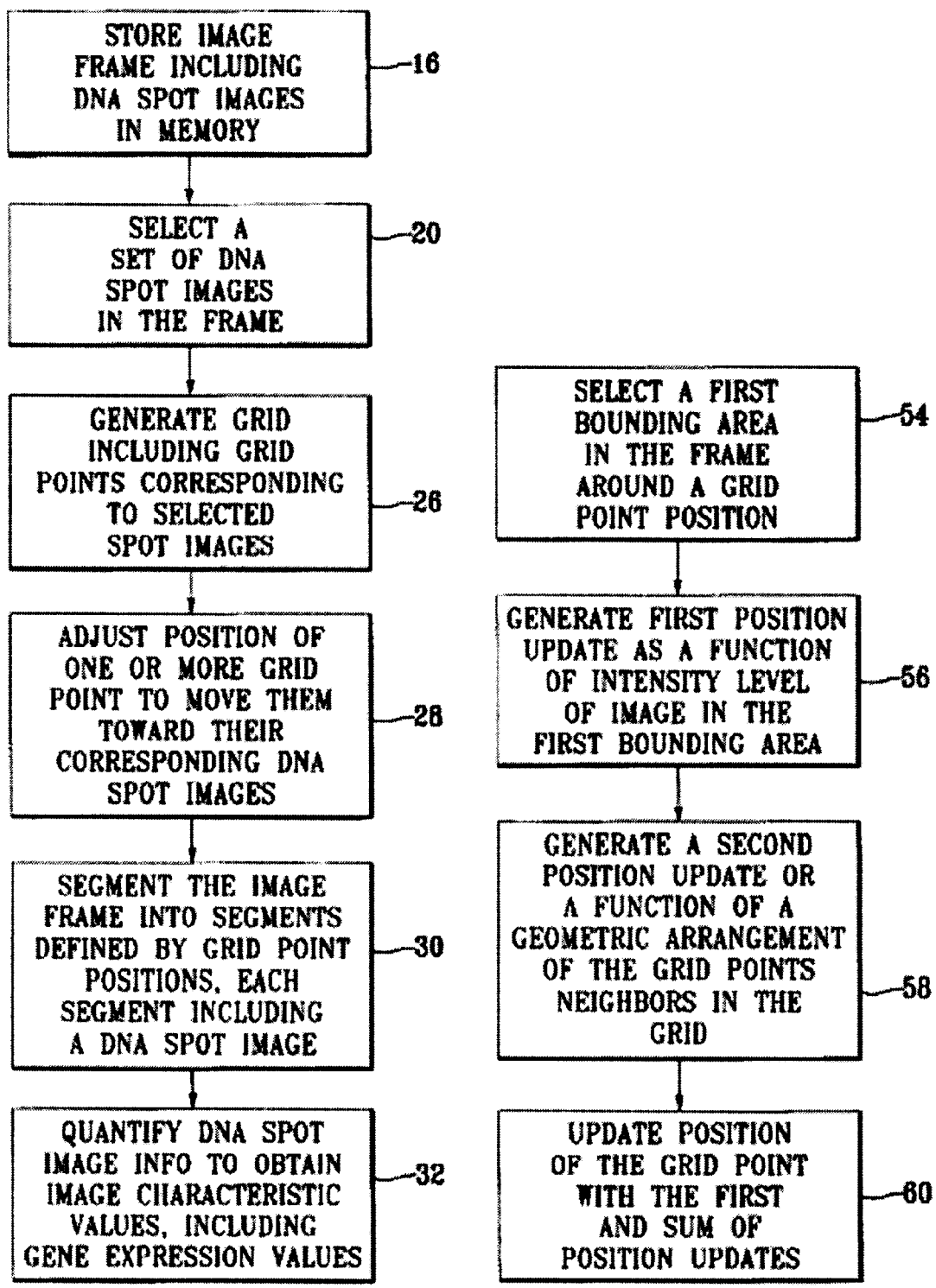
Figure 5:
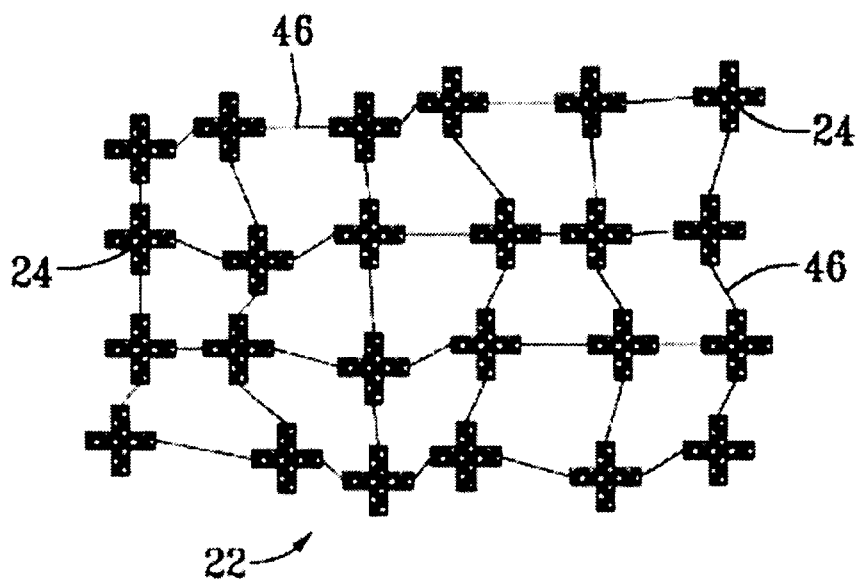
FIG. 5 is a graphic representation of the grid of FIG. 4 deformed according to the method of FIG. 3a to substantially match placement of DNA spot images in a micro-array.

Since it is assumed that the pixel intensity corresponding to DNA spots images 10 in the image region 18 are greater than their surrounding background 50 intensity values, the computer 34, according to the above steps, automatically shifts each grid point 24 towards local regions with the highest intensity values in subsequent iterations of said steps, wherein each grid point's location in the image frame 12 is modified. FIG. 5 illustrates an example representations of the grid 22 with grid points 24 so shifted. A similar process can be applied to the image frame 12 in reverse video. Referring to FIG. 3b, an embodiment of the step of modifying (step 28) comprises: (i) selecting a first bounding area 52 in the control image 12 around the current position of a grid point 24 (step 54); (ii) generating a first position update including position information for updating a current position of said grid point 24 to a first new position 48 within the first bounding area 52, the location of said first new position 48 relative to said current position being a function of intensity level of at least a portion of the image within the first bounding area 52 (step 56); (iii) generating a second position update including position information for updating said current position to a second new position 49 in the control image 12, said second new position 49 being in a geometric arrangement with the position of one or more grid points 24 around said grid point 24 (step 58); and (iv) updating said current position with the position information of the first and the second position updates, thereby shifting said grid point 24 toward the corresponding spot image 10 (step 60).

Figure 6:
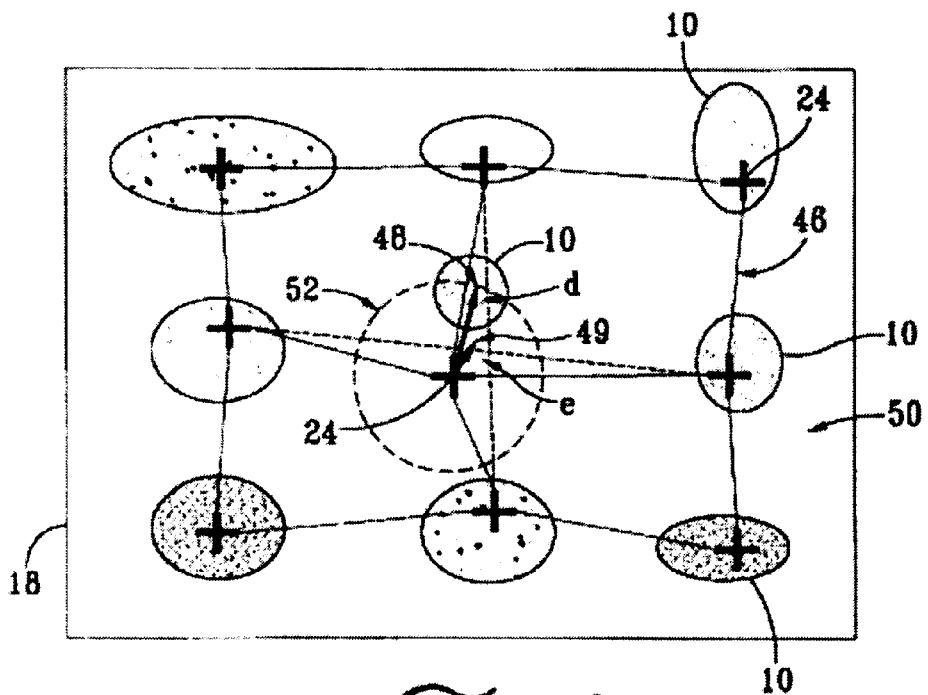
FIG. 6 is a graphic illustration of updating the position of a grid point in a grid according to the method of FIG. 3b.

The position matrix elements are modified and updated by the computer 34 during multiple iterations of the above steps. FIG. 6 is a graphic illustration of updating the position of a grid point 24 in the grid 22 according to the above steps. In the embodiment of the invention described herein, the first position update comprises a normalized direction vector d, based on the pixel intensity values within the first bounding area 52 around the grid point 24. The first bounding area 52 can comprise a bounding box of size r×r, or a circle of radius r centered on the current position of the grid point 24. The direction vector d can comprise an average or a weighted sum of vectors defining arrows originating at the center of the first bounding area 52 and ending at a plurality of the pixel locations within the first bounding area 52. The intensity value at each such pixel location can be used as the weight coefficient for calculating the weighted sum of said vectors. The direction vector d can be based on the direction of the local intensity gradient. Other weighting coefficients can also be utilized.

An example calculation of the direction vector d for said bounding box of size r×r is described below. The bounding box is represented as a matrix P in the memory 14 with n columns and m rows, and elements $p_{ij}$ corresponding to image intensity values at a location (i, j) in the bounding box. The direction vector d is calculated as:

$$T = \sum_{i=1}^{n} \sum_{j=1}^{m} p_{ij}$$

$$s_j = \frac{\sum_{i=1}^{n} P_{ij}}{T}$$

$$t_i = \frac{\sum_{j=1}^{m} P_{ij}}{T}$$

$x_L$=Number of pixels from the left edge to the center of P
$x_R$=Number of pixels from the right edge to the center of P
$y_t$=Number of pixels from the top edge to the center of P
$y_b$=Number of pixels from the bottom edge to the center of P $X=[-x_L-(x_L+1) \ldots -1\ 0\ 1\ 2 \ldots (x_R+1)x_R]$ $Y=[-y_b-(y_b+1) \ldots -1\ 0\ 1\ 2 \ldots (y_t+1)y_t]$ $$dx = \sum_{j=1}^{m} s_j X_j$$

$$dy = \sum_{i=1}^{n} t_i Y_i$$

d=[dx dy]

Using a priori information about the location of DNA spot images 10 in the frame 12, i.e., almost a uniform 2-D array, the second position update is generated to place an additional constraint on the movement of the grid points 24. In the embodiment described herein, the constraint maintains the position of a grid point 24 in a linear geometric arrangement relative to position of one or more of neighboring grid points 24 in vertical and horizontal directions. Other geometric arrangements such as curves can also be selected. The neighboring grid points 24 can be selected by the user, or automatically selected by the computer 34, to include one or more of first and second order neighbors of the grid point 24. In this embodiment, the second position update comprises another direction vector e, defining an arrow pointing at the mean location of the mid point between the first order neighbors in the horizontal direction to the left and right of the grid point 24, and the mid point between the first order neighbors in the vertical direction to the top and bottom of the grid point 24. The direction vector, e, attempts to keep the spacing between adjacent grid points 24 equal by using a linear geometric arrangement discussed above.

An example calculation of the direction vector e for a grid point 24 with a spatial position vector L having elements $L_x$ and $L_y$ is described below. Eight first and second order neighboring grid points around said grid point include spatial vectors: (1) A with elements $A_x$ and $A_y$, (2) B with elements $B_x$ and $B_y$, (3) C with elements $C_x$ and $C_y$, (4) D with elements $D_x$ and $D_y$, (5) E with elements $E_x$ and $E_y$, (6) F with elements $F_x$ and $F_y$, (7) G with elements $G_x$ and $G_y$, and (8) H with elements $H_x$ and $H_y$, as shown in diagram 1.

Diagram 1

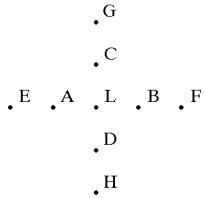

The vector e is calculated as:
When said first order neighbors are used:

$\tilde{X}=(A_x+B_x)/2+(C_x+D_x)/2$ $\tilde{Y}=(A_y+B_y)/2+(C_y+D_y)/2$ $dx=\tilde{X}/2-L_x\ dy=\tilde{Y}/2-L_y$ When first and second order neighbors are used:

$\tilde{X}=[(A_x+B_x)+(C_x+D_x)]+(F_x+E_x)/2+(G_x+H_x)/2$ $\tilde{Y}=[(A_y+B_y)+(C_y+D_y)]+(F_y+E_y)/2+(G_y+H_y)/2$ $dx=\tilde{X}/6-L_x\ dy=\tilde{Y}/6-L_y$ e=[dx dy]

The computer 34 then linearly combines the direction vectors d and e to obtain a direction vector t for updating the position of the grid point 24:

$t=\alpha d+\beta e$

Where $\alpha$ and $\beta$ are weighting coefficient parameters, with an example $\alpha$ or $\beta$ range 0 to 10. The larger the value of $\beta$ relative to $\alpha$, the stiffer are connections 46 between adjacent grid points 24.

The spatial position L of said grid point 24 is then updated as:

$L \leftarrow L+\eta t$

Where $\eta$ is the update rate with an example range of 0 to 1. The upper limit of said range for $\alpha$ or $\beta$ is inversely proportion to an upper limit of $\eta$.

The local neighborhood size defined by the first bounding area 52 for each grid point 24 can be gradually reduced after each iteration, or every few iterations, of the modification step 28 described above. The number of iterations is typically around forty and can be increased or decreased by the user to optimize the grid position appropriate for the image spots 10.

After a number of iterations, the user can instruct the computer 34 to perform further tasks according to the present invention, including: (1) executing more iterations to optimize the location of the grid points 24, (2) redrawing the grid 22, (3) canceling out of the grid placement, or (4) accepting the current grid placement and proceed to segmentation and quantification steps 30, 32 described below. All of the above steps can be implemented using program instructions to be executed by a computer.

Figure 7:
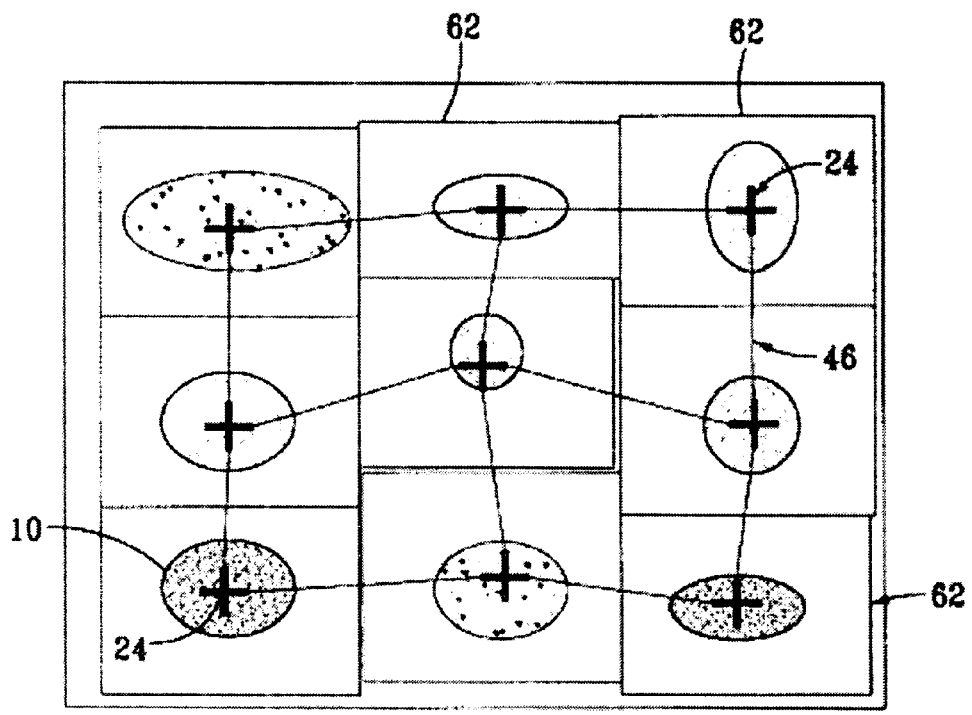

Referring to FIG. 7, once the user is satisfied with the grid position, the method of the present invention further includes the step of segmenting the selected region 18 into a plurality of image segments 62 corresponding to the plurality of grid points 24 in the grid (step 32). Each image segment 62 defines an area around a corresponding grid point 24 and includes a corresponding spot image 10 with minimum distance from said grid point 24. The size and shape of each segment 62 for each grid point 24 is a function of the spacing between said grid point 24 and one or more neighboring grid points 24.

As an example, for the two-dimensional grid 22, the programmed computer automatically segments the image region 18 into the segments 62 each having: (a) a width substantially equal to the smaller of: (i) the distance between the positions of the grid point 24 in the image segment 62 and the midpoint between said grid point 24 and an adjacent grid point to the left of said grid point 24, and (ii) the distance between the positions of said grid point 24 and the midpoint between said grid point 24 and an adjacent grid point to the right of said grid point 24; and (b) a height substantially equal to the smaller of: (i) the distance between the positions of a said grid point 24 and the midpoint between said grid point 24 and an adjacent grid point to the left of said grid point 24, and (ii) the distance between the positions of said grid point 24 and the midpoint between said grid point 24 an adjacent grid point to the right of said grid point 24.

The method of the present invention can further include the step of quantifying at least a portion of image information in each image segment 62 to obtain image characteristic values for the image segment 62 (step 34). Each spot image 10 in an image segment 62 can be used to measure the gene expression signal value and local background intensity levels according to a number of different user selected quantification methods. Five example quantification methods are described below.

Segmented Intensities: This method includes sorting all the pixel intensities within an image segment 62, selecting a portion, for example the top 10%, of said intensity values, and calculating the mean of the selected intensity values as a signal value. A similar portion, for example the bottom 10%, of intensity values is also selected and its mean value is provided as the local background intensity level.

Fixed Circle Mean Intensity: In this method, a fixed circle of user specified size is centered at each grid point 24 in the image segment 62. The mean intensity value of all pixels within the circle is provided as the signal value of the image spot 10 in the image segment 62 and the mean intensity value of the surrounding pixels are reported as the background intensity levels.

Fixed Circle Total Intensity: This method is similar to the Fixed Circle Mean Intensity method described above, except, total sum of all intensity values is provided in place of the mean values.

Fixed Circle Segmented Intensity: This method is a combination of the above three methods where the mean of certain predefined portion of the intensity values within the circle is provided as the signal value and the mean of another predefined portion of the intensity values outside the circle is provided as the background intensity level.

Automatic Circle Detection: This method is similar to Fixed Circle Segmented Intensity method except, an automatic spot detection method is used to localize each image spot 10 in the image segment 62. Such a detection method can comprise a Hough transform for circle detection, a match-filter approach for optimum match between filters of various sizes to the data, or other detection methods.

Other quantification methods can also be utilized and are contemplated by the present invention. As such, the present invention provides an automatic method for refining the position of grid points 24 to optimally match the arrayed spot images 10 in micro-array images 12, using the dynamic elastic grid 22. The user need only specify the four corners 42 of a region 18 in a micro-array image 12, and the number of rows and columns of the image spots 10 in the microarray. Non-rectangular griddling patterns are also contemplated by the present invention.

In another aspect, the present invention provides a computer system 34, described further below, for segmentation of the frame 12 of image information including the plurality of spaced DNA spot images 10 corresponding to the plurality of DNA spots, said image information including image intensity level information corresponding to said DNA spots. In one embodiment, the computer system comprises means for performing the above steps of the method of the present invention described herein and shown in FIGS. a and 3b. Said means include program instructions for configuring a general purpose, or dedicated computer, to perform said steps. The present invention further provides a software system including program instructions for configuring a computer system to perform the above steps described herein and shown in FIGS. a and 3b.

Figure 8:
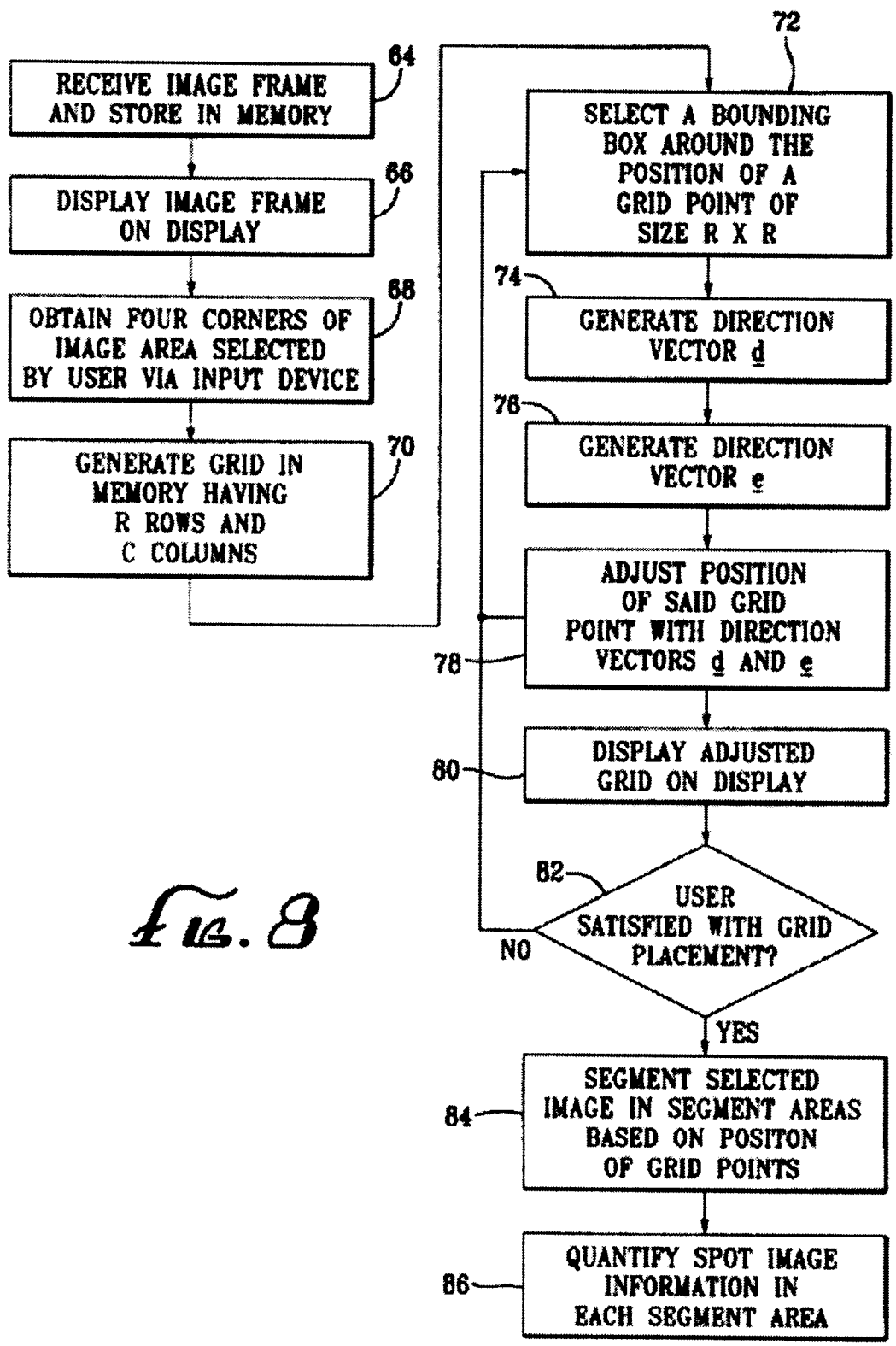

FIG. 8 illustrates an example general flow diagram for the program instructions of the computer system 34 and the software system of the present invention described above. Referring to the flow diagram, the program instructions include steps for: receiving and storing the image frame 12 in memory 14 (step 64); displaying the image frame 12 on the display 40 (step 66); obtaining four corners 42 of the image region 18 selected by user via the input device 38 (step 68); generating the grid 22 of R rows and C columns in the memory 14 as described above (step 70); forming a bounding box 52 of size r×r around a grid point (step 72); calculating the direction vector d as described above (step 74); calculating the direction vector e as described above (step 76); adjusting position of said grid point 24 with direction vectors d and e (step 78); displaying the adjusted grid 22 on the display 40 (step 80); determining if user is satisfied with the adjusted grid 22 (step (82); if not, proceeding to step 72 to adjust other grid point positions, otherwise, proceeding to step 84 to segment the selected image 18 into segments 62 as described above; and quantifying DNA spot image information for spot images 10 in the segments 62 as described above (step 86).

The program instructions can be implemented utilizing a program language such as MatLab™, C, Fortran, C++, and executed by a computer system 34 described below. Mathematical calculations and image display can be implemented utilizing a simulation package or a math library such as MatLab, from Mathworks™, located in Natick. The program instructions and related data are stored in the memory of the computer, to be executed by the processor to interact with the display, input device and storage in performing the steps described above. Alternatively, the program instructions and related data can be used to program a dedicated graphics system to perform the above steps, the graphics system including a processor, a memory device, display, input device, storage and image input means such as a scanner. In such a system, DNA micro-arrays are scanned into the memory device as image frames for processing as described above.

The values provided by one or more of the above quantification methods can be stored, as an ASCII file for example, and also saved in the memory 14 for comparison and display with similar quantified values corresponding to one or more other DNA micro-array images 12 according to another aspect of the present invention. In addition to the control image 12, the user can also select one or more non-control images. The grid position determined in steps described above can be applied, with any user defined translation or transformation, to the non-control image to quantify expression values according to the quantification methods described above. Typically, the control image 12 is generated by scanning a micro-array with one particular laser frequency, and the non-control image is generated by scanning the same micro-array with a different frequency laser. Different tags, each sensitive to one of the two laser frequencies are used to label DNA fragments from two different tissue types, e.g., healthy and diseased tissue. It is one of the main goals of micro-array data analysis to identify those sets of genes that are differentially expressed in different tissues. Extracted signal and background intensity levels for each gene (each DNA spot in the micro-array) can be displayed according to the present invention to visualize the differential gene expression levels between the control and non-control images.

Figure 9:
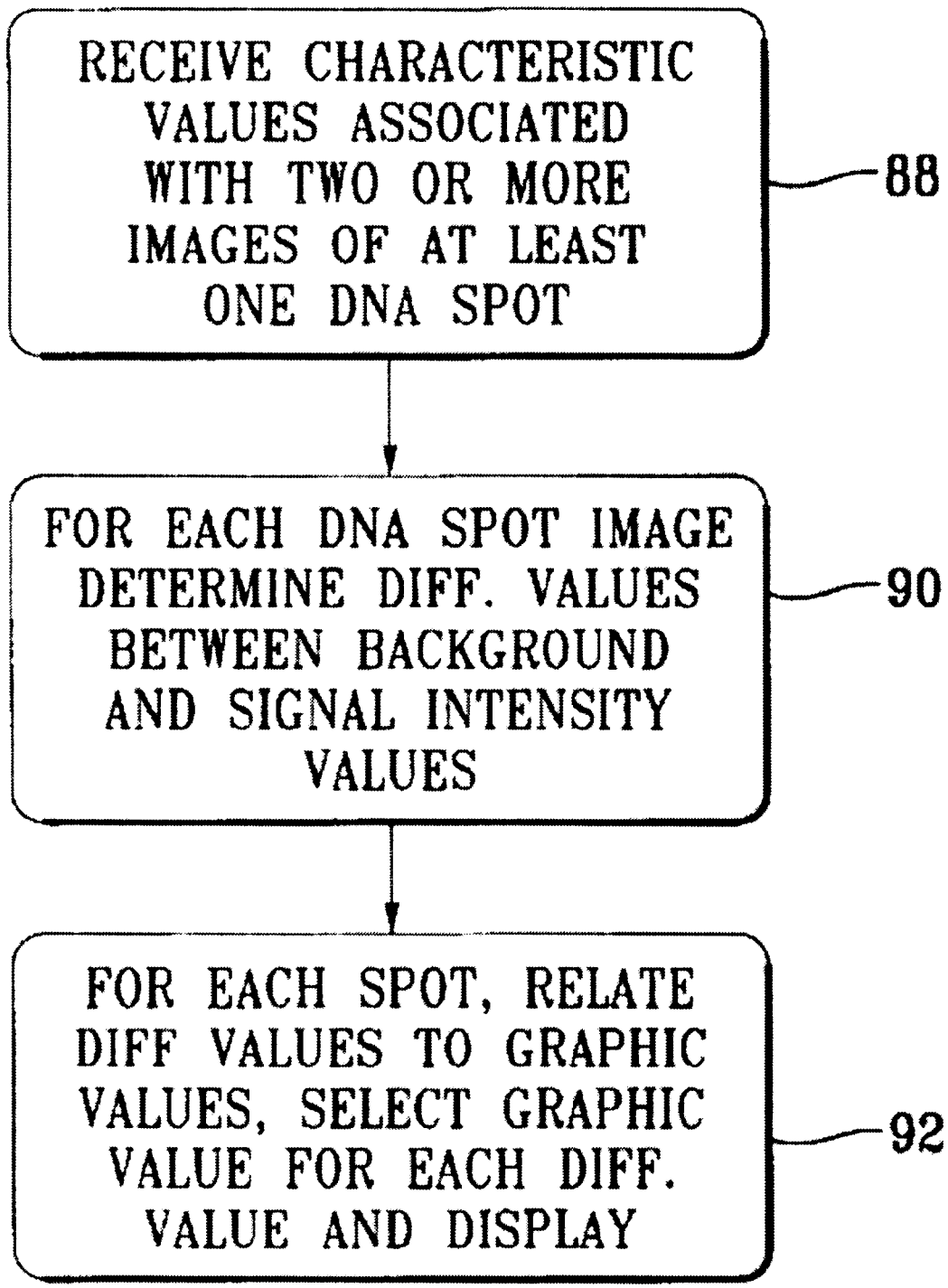
FIG. 9 illustrates the steps of an embodiment of a display method according the present invention for displaying quantified image information corresponding to DNA spots.

Referring to FIG. 9, an embodiment of the steps of such a display method for displaying image information corresponding to a plurality of DNA spot images 10 of at least one DNA spot, the image information including image characteristic values including background and signal intensity levels, comprises the steps of: (a) receiving image characteristic values for DNA spot images 10 in said control and non-control images (step 88); (b) for each DNA spot image 10: (1) extracting said background and signal intensity levels from the image characteristic values for the spot image 10, and (2) determining difference values between the background intensity levels and signal intensity levels (step 90); and (c) for each DNA spot: (1) relating the corresponding difference values to a range of graphic values, (2) selecting a graphic value for each difference value; and (3) displaying the selected graphic values (step 92). The graphic values can include graphic objects 93 and color characteristic values as described below.

Applying said display method to the control and non-control images described above, includes the steps of: (a) determining difference values between the background intensity levels and the signal intensity levels for both the control and non-control images, (b) displaying both difference values for all spots in the micro-array using a plurality of graphic objects 93 such as pie charts 94 or bar graphs 96, each graphic object corresponding to a DNA spot, (c) probing each graphic object 93 to examine the expression levels, ratios, and other similar information, including displaying corresponding image segments form the control and non-control images for a selected graphic object 93.

Figure 10:
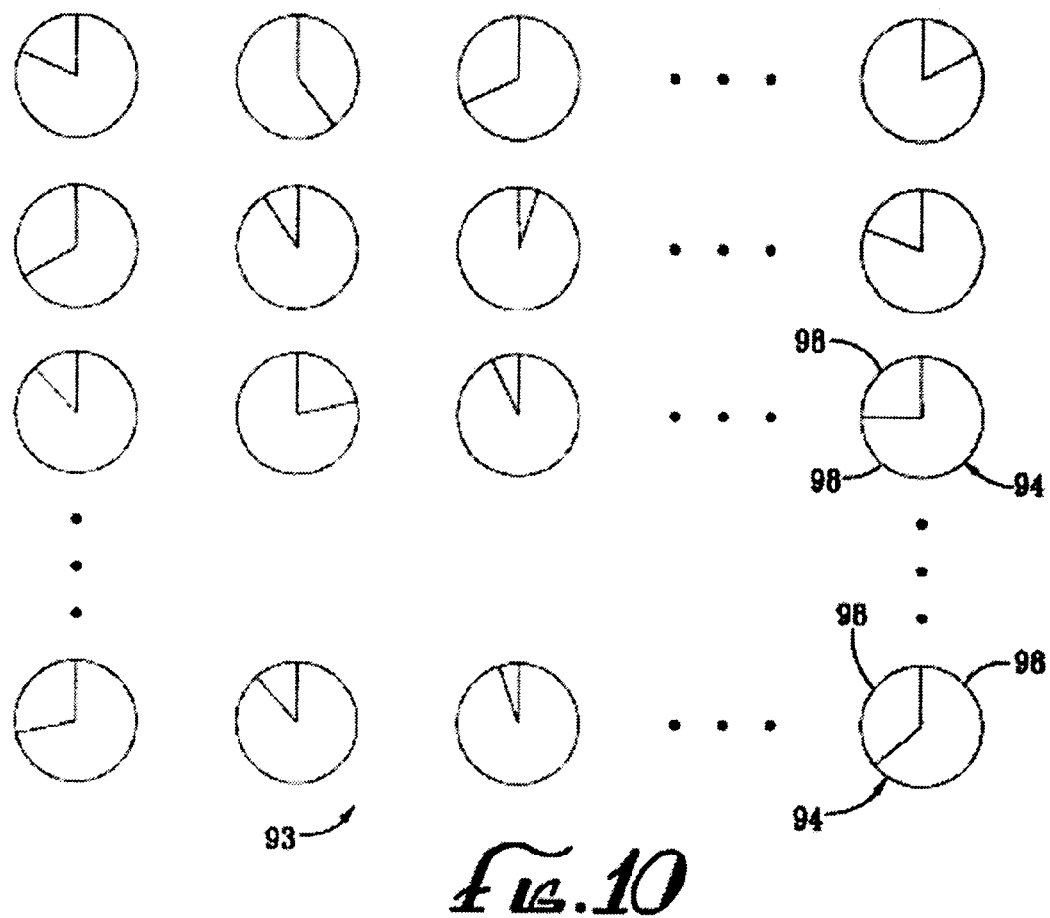
FIG. 10 illustrates differential gene expression levels for different images of a micro-array displayed as pie charts according to an embodiment of a display method of FIG. 9.
Figure 11A:
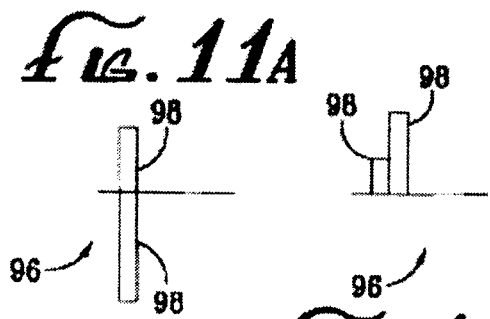
FIGS. 11a–d illustrates differential gene expression levels for different images of a micro-array displayed as bar graphs according to another embodiment of a display method of FIG. 9.
Figure 11B:
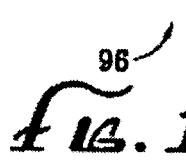
Figure 11C:
Figure 11D:

Referring to FIG. 10, each difference value is associated to a segment 98 of a pie chart 94 having multiple segments, and the segments 98 as displayed a pie chart. The area of each segment 98 of each pie chart 94 can be a function of the magnitude of the associated difference value. Further, color characteristic values can be assigned to the pie segments 98 by: (1) relating the corresponding difference values to a range of color characteristic values; (2) selecting a color characteristic value for each difference value; and (3) displaying the selected color characteristic value in the corresponding pie chart segments 98. As such, each pie chart segment 98 among a plurality of pie segments can have a different color characteristic value. The color characteristic values can include color, hue, brightness, intensity, and texture.

In the example pie chart embodiment 94 of the graphic objects 93 shown in FIG. 10, each pie chart 94 includes at least two segments: (1) a segment representing difference values between the background and signal intensity levels of a spot image 10 in the control image, corresponding to a DNA spot, and (2) another segment representing difference values between the background and signal intensity levels of a spot image 10 in the non-control image, corresponding to said DNA spot. Each pie chart 94 can include additional segments for visualizing other differences associated with images 10 of a DNA spot in additional non-control images. As shown in FIG. 10 the graphic objects 93 can be arranged, for example, in the order in which their corresponding DNA spot images 10 appear in the control and non-control images. The user can also specify a different desired grouping of the graphic objects. The display arrangement can also be different from that of DNA spots.

Referring to FIGS. 11 *a–d*, the graphic objects 93 are shown as the bar graphs 96, wherein each difference value is associated to a segment 98 of a bar graph having multiple segments, and the segments are displayed as a bar graph. The arrangement, segment size and segment attributes of the bar graphs 96 can be identical to those of the pie charts 94 described above. Further, one or more type of the bar graphs 96 can be displayed in the same arrangement as shown for the pie charts 94 in FIG. 10.

In another aspect, the present invention provides a computer system 34 for displaying image information corresponding to the plurality of DNA spot images 10 of at least one DNA spot, the image information including image characteristic values including background and signal intensity levels. In one embodiment, the computer system 34 comprises means for performing the steps of the display method described above. Said means include program instructions for configuring a general purpose or dedicated computer to perform said steps. The present invention further provides a software system including program instructions for configuring a computer system to perform the steps of said display method.

Figure 12:
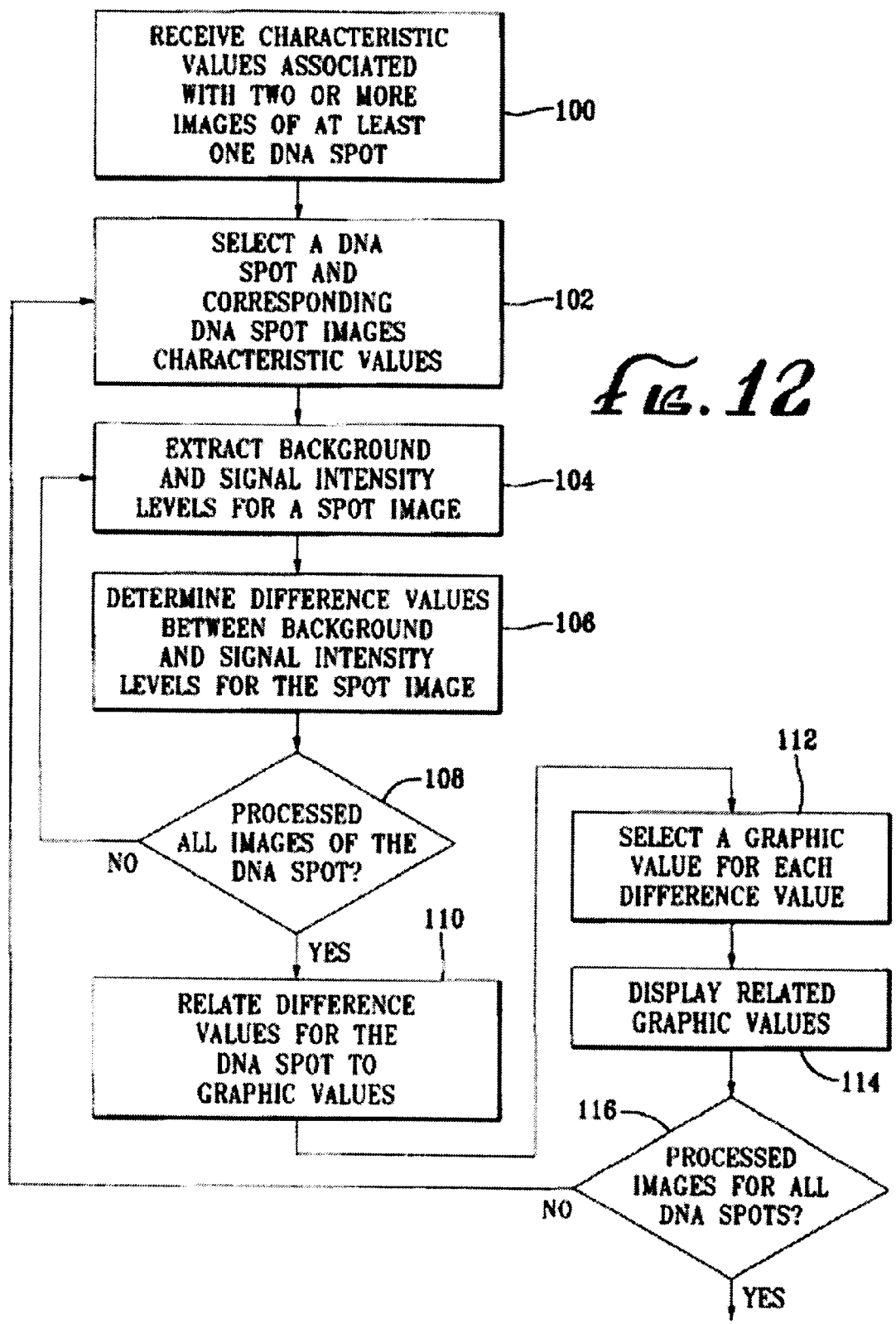
FIG. 12 illustrates an example flow diagram for program instructions for implementing the display method of FIG. 9.

FIG. 12 illustrates a general flow diagram for the program instructions of the display computer system and the display software system of the present invention described above. Referring to the flow diagram, the program instructions include steps for: receiving and storing said characteristic values in memory 14 (step 100); selecting a DNA spot and corresponding DNA spot images' characteristic values (step 102); extracting background and signal intensity values for a image spot 10 (step 104); determining difference values between said background and intensity values (step 106); determining in step 108 if all spot images corresponding to said DNA spot have been so processed; if not, proceeding to step 104 to other spot images corresponding to said DNA spot, otherwise, relating the difference values to graphic values as described above (step 110); selecting a graphic value for each difference value as described above (step 112); displaying the selected graphic values as described above (step 114); and determining, in step 116 if all images for all DNA spots have been so processed, if not, proceeding to step 102 to process images for other DNA spots.

The program instructions can be implemented utilizing a program language such as MatLab, AVS/Expert, and Java, and executed by a computer system described below. Mathematical calculations can be implemented utilizing a simulation package or a math library such as MatLab, from Mathworks. The program instructions and related data are stored in the memory of the computer, to be executed by the processor to interact with the display, input device and storage in performing the steps described above. Alternatively, the program instructions and related data can be used to program a dedicated graphics system to perform the above steps, the graphics system including a processor, a memory device, display, input device, storage and image input means such as a scanner. In such a system, DNA micro-arrays are scanned into the memory device as image frames for processing as described above. Alternatively, the program instructions and related data can be used to program a dedicated graphics system to perform the above steps, the graphics system including a processor, a memory device, display, input device, storage and image input means such as a scanner. In such a system, DNA micro-arrays are scanned into the memory device as image frames for processing as described above.

A suitable computer system 34 for executing said program instructions can be a dedicated computer such as a computer dedicated to scanning micro-arrays and processing micro-array images, or a general purpose computer system such as a personal computer or a dedicated computer system. FIG. 13 shows a functional block diagram of the computer system 34 embodying the present. A central processing unit (CPU) 36 operates on program instructions in the memory 14 using a processing unit 118. The CPU 36 also has a clock/calendar logic circuit 120 for maintaining an internal time/date clock. A storage device 122 for storing information pertaining to micro-array images is connected to the CPU 36 over a bus 124. The micro-array images can be located on a file server 126 over a LAN or local to the CPU. A keyboard 128 or mouse 38 receives instructions from the user concerning the DNA image micro-array analysis as necessary. A scanner 130 allows scanning micro-arrays and obtaining images frames for processing as described above, and a printer 132 allows printing of images and data. The main memory 14 stores the program instructions implementing the method of the present invention. An example of a computer system suitable is a microcomputer equipped with a Pentium II™ microprocessor running at 266 MHZ. Such a system is preferably equipped with at least 64 MB megabytes of random access memory and a 2.0 GB hard drive. The system preferably runs an operating system such as the Windows™ operating environment. Windows™ is manufactured by Microsoft Corporation, Redmond, Wash.

Although the present invention has been described in considerable detail with regard to the preferred versions thereof, other versions are possible. Therefore, the appended claims should not be limited to the descriptions of the preferred versions contained herein.

What is claimed is:

1. A method of displaying image characteristic information for a frame of image information including a plurality of spaced DNA spot images, corresponding to plurality of DNA spots, the image information being maintained in memory, comprising the steps of:

for each DNA spot image within the frame of image information: relating at least a portion of said image characteristic information to a range of graphic values, selecting a graphic value for each image characteristic information, and displaying the selected graphic values arranged generally corresponding to the respective spatial relationship of the respective DNA spot images in the frame of image information.

2. The method of claim 1, wherein the image characteristic values comprise background and signal intensity levels, the method further comprising the steps of:

for each DNA spot image: extracting said background and signal intensity levels from at least a portion of the image characteristic values for the spot image, and determining difference values between the background intensity levels and signal intensity levels;

wherein said steps of relating, selecting and displaying further comprises the steps of:

for each DNA spot image: relating at least a portion of the corresponding difference values to a range of graphic values, selecting a graphic value for each difference value; and displaying the selected graphic values.

3. The method of claim 2, wherein said image information corresponds to a plurality of DNA spot image sets corresponding to a plurality of DNA spots, each image set including a plurality of DNA spot images corresponding to a DNA spot.

4. The method of claim 3, wherein: the steps of relating and selecting include associating each difference value to a segment of a pie chart having multiple segments, and the step of displaying the selected graphic values includes displaying said segments as a pie chart, whereby each pie chart corresponds to a DNA spot.

5. The method of claim 4, wherein the area of each segment of each pie chart is a function of the magnitude of the associated difference value.

6. The method of claim 5, wherein the DNA spots have a predetermined spatial arrangement, and wherein the step of displaying includes displaying the pie charts in the same spatial arrangement, wherein each pie chart is displayed in the order of appearance of its corresponding DNA spot in said arrangement.

7. The method of claim 6, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

8. The method of claim 3, wherein: the steps of relating and selecting include associating each difference value to a segment of a bar graph having multiple segments, and the step of displaying the selected graphic values includes displaying said segments as a bar graph, whereby each bar graph corresponds to a DNA spot.

9. The method of claim 8, wherein the area of each segment of each bar graph chart is a function of the magnitude of the associated difference value.

10. The method of claim 9, wherein the DNA spots have a predetermined spatial arrangement, and wherein the step of displaying includes displaying the bar graphs in the same spatial arrangement, wherein each bar graph is displayed in the order of appearance of its corresponding DNA spot in said arrangement.

11. The method of claim 10, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

12. The method of claim 10, further comprising:

wherein the image information for each DNA spot is generated according to the following steps:

for each DNA spot image:

relating at least a portion of said image characteristic values corresponding values to a range of graphic values;

selecting a graphic value for each image characteristic value; and, displaying the selected graphic values; and, wherein said image information corresponds to a plurality of DNA spot image sets corresponding to a plurality of DNA spots, each image set including a plurality of DNA spot images corresponding to a DNA spot.

13. The method of claim 2, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

14. The method of claim 2, further comprising:

wherein the image information for each DNA spot is generated according to the following steps:

for each DNA spot image:

relating at least a portion of said image characteristic values corresponding values to a range of graphic values;

selecting a graphic value for each image characteristic value; and, displaying the selected graphic values; and, wherein said image information corresponds to a plurality of DNA spot image sets corresponding to a plurality of DNA spots, each image set including a DNA spot images corresponding to a DNA spot.

15. The method of claim 1, wherein said image information corresponds to a plurality of DNA spot image sets corresponding to a plurality of DNA spots, each image set including a plurality of DNA spot images corresponding to a DNA spot.

16. The method of claim 15, wherein: the steps of relating and selecting include associating each image characteristic value to a segment of a pie chart having multiple segments, and the step of displaying the selected graphic values includes displaying said segments as a pie chart, whereby each pie chart corresponds to a DNA spot.

17. The method of claim 16, wherein the area of each segment of each pie chart is a function of the magnitude of the associated image characteristic value.

18. The method of claim 17, wherein the DNA spots have a predetermined spatial arrangement, and wherein the step of displaying includes displaying the pie charts in the same spatial arrangement, wherein each pie chart is displayed in the order of appearance of its corresponding DNA spot in said arrangement.

19. The method of claim 18, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

20. The method of claim 15, wherein: the steps of relating and selecting include associating each image characteristic value to a segment of a bar graph having multiple segments, and the step of displaying the selected graphic values includes displaying said segments as a bar graph, whereby each bar graph corresponds to a DNA spot.

21. The method of claim 20, wherein the area of each segment of each bar graph chart is a function of the magnitude of the associated image characteristic value.

22. The method of claim 20, wherein the DNA spots have a predetermined spatial arrangement, and wherein the step of displaying includes displaying the bar graphs in the same spatial arrangement, wherein each bar graph is displayed in the order of appearance of its corresponding DNA spot in said arrangement.

23. The method of claim 22, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

24. The method of claim 1, further comprising the steps of generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

25. A software system for configuring a computer system comprising a processor, and a memory device, for displaying image characteristic information for a frame of image information including a plurality of spaced DNA spot images corresponding to a plurality of DNA spots, the software system comprising program instructions for:

for each DNA spot image within the frame of image information: relating at least a portion of said image characteristic information to a range of graphic values, selecting a graphic value for each image characteristic information; and displaying the selected graphic value, arranged generally corresponding to the respective spatial relationship of the respective DNA spot images in the frame of image information.

26. The software system of claim 25, wherein said image information corresponds to a plurality of DNA spot image sets corresponding to a plurality of DNA spots, each image set including a plurality of DNA spot images corresponding to a DNA spot.

27. The software system of claim 26, wherein: the program instructions for relating and selecting include program instructions for associating each image characteristic value to a segment of a pie chart having multiple segments, and the program instructions for displaying the selected graphic values include program instructions for displaying said segments as a pie chart, whereby each pie chart corresponds to a DNA spot.

28. The software system of claim 27, further comprising program instructions for selecting the area of each segment of each pie chart to be a function of the magnitude of the associated image characteristic value.

29. The software system of claim 28, wherein the DNA spots have a predetermined spatial arrangement, and wherein the program instructions for displaying further include program instructions for displaying the pie charts in the same spatial arrangement, wherein each pie chart is displayed in the order of appearance of its corresponding DNA spot in said arrangement.

30. The software system of claim 29, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

31. The software system of claim 26, wherein: the program instructions for relating and selecting include program instructions for associating each image characteristic value to a segment of a bar graph having multiple segments, and the program instructions for displaying the selected graphic values include program instructions for displaying said segments as a bar graph, whereby each bar graph corresponds to a DNA spot.

32. The software system of claim 31, further comprising program instructions for selecting the area of each segment of each bar graph to be a function of the magnitude of the associated image characteristic value.

33. The software system of claim 32, wherein the DNA spots have a predetermined spatial arrangement, and wherein the program instructions for displaying further include program instructions for displaying the bar graphs in the same spatial arrangement, wherein each bar graph is displayed in the order of appearance of its corresponding DNA spot in said arrangement.

34. The software system of claim 33, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

35. The software system of claim 25, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

36. The software system of claim 25 wherein the image characteristic values comprise background and signal intensity levels, the software system further comprising program instructions for:

for each DNA spot image: extracting said background and signal intensity levels from the image characteristic values for the spot image, and (2) determining difference values between the background intensity levels and signal intensity levels;

wherein the program instructions for relating, selecting and displaying comprise program instructions for:

for each DNA spot image: relating the corresponding difference values to a range of graphic values, selecting a graphic value for each difference value; and displaying the selected graphic values.

37. The software system of claim 36, wherein said image information corresponds to a plurality of DNA spot image sets corresponding to a plurality of DNA spots, each image set including a plurality of DNA spot images corresponding to a DNA spot.

38. The software system of claim 37, wherein: the program instructions for relating and selecting include program instructions for associating each difference value to a segment of a pie chart having multiple segments, and the program instructions for displaying the selected graphic values include program instructions for displaying said segments as a pie chart, whereby each pie chart corresponds to a DNA spot.

39. The software system of claim 38, further comprising program instructions for selecting the area of each segment of each pie chart to be a function of the magnitude of the associated difference value.

40. The software system of claim 39, wherein the DNA spots have a predetermined spatial arrangement, and wherein the program instructions for displaying further include program instructions for displaying the pie charts in the same spatial arrangement, wherein each pie chart is displayed in the order of appearance of its corresponding DNA spot in said arrangement.

41. The software system of claim 40, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

42. The software system of claim 37, wherein: the program instructions for relating and selecting include program instructions for associating each difference value to a segment of a bar graph having multiple segments, and the program instructions for displaying the selected graphic values include program instructions for displaying said segments as a bar graph, whereby each bar graph corresponds to a DNA spot.

43. The software system of claim 42, further comprising program instructions for selecting the area of each segment of each bar graph to be a function of the magnitude of the associated difference value.

44. The software system of claim 43, wherein the DNA spots have a predetermined spatial arrangement, and wherein the program instructions for displaying further include program instructions for displaying the bar graphs in the same spatial arrangement, wherein each bar graph is displayed in the order of appearance of its corresponding DNA spot in said arrangement.

45. The software system of claim 44, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

46. The software system of claim 36, further including program instructions for generating said image characteristic values for one or more DNA spots by steps including:

receiving a frame of image information including a plurality of spaced DNA spot images corresponding to a plurality of DNA spots, said image information including image intensity level information corresponding to said DNA spots;

selecting a set of image information within said frame including a selected set of the DNA spot images;

generating a grid including a plurality of spaced grid points corresponding to said selected DNA spot images, each grid point including position information indicating the position of the grid point within said frame;

modifying a current position of at least one grid point corresponding to a spot image in said selected image to shift said grid point toward the corresponding spot image;

segmenting the selected set of image information by selecting at least one image segment defining a segment area around a grid point and including a spot image with minimum distance from said grid point; and quantifying at least a portion of image information in said image segment to obtain image characteristic values for said image segment;

wherein the image characteristic values include DNA information for a DNA spot corresponding to the DNA spot image in said image segment, said DNA information including gene expression values.

47. The method of claim 36, further comprising:
wherein the image information for each DNA spot is generated according to the following steps:
for each DNA spot image:
relating at least a portion of said image characteristic values corresponding values to a range of graphic values;
selecting a graphic value for each image characteristic value; and, displaying the selected graphic values; and,
wherein said image information corresponds to a plurality of DNA spot image sets corresponding to a plurality of DNA spots, each image set including a plurality of DNA spot images corresponding to a DNA spot.

48. A computer system for displaying image characteristic information for a frame of image information including a plurality of spaced DNA spot images corresponding to a plurality of DNA spots, the computer system comprising:
means for relating at least a portion of the image characteristic values to a range of graphic values for each DNA spot image within the frame of image information;
means for selecting a graphic value for each image characteristic information; and
means for displaying the selected graphic values arranged generally corresponding to the respective spatial relationship of the respective DNS spot images in the frame of image information.

49. The computer system of claim 48, wherein said image information corresponds to a plurality of DNA spot image sets corresponding to a plurality of DNA spots, each image set including a plurality of DNA spot images corresponding to a DNA spot.

50. The computer system of claim 49, wherein: the means for relating and selecting include means for associating each image characteristic value to a segment of a pie chart having multiple segments, and the means for displaying the selected graphic values include means for displaying said segments as a pie chart, whereby each pie chart corresponds to a DNA spot.

51. The computer system of claim 50, further comprising means for selecting the area of each segment of each pie chart to be a function of the magnitude of the associated image characteristic value.

52. The computer system of claim 51, wherein the DNA spots have a predetermined spatial arrangement, and wherein the means for displaying further include means for displaying the pie charts in the same spatial arrangement, wherein each pie chart is displayed in the order of appearance of its corresponding DNA spot in said arrangement.

53. The computer system of claim 52, further including image generation means for generating said image characteristic values for one or more DNA spots, said image generation means including:
means for receiving a frame of image information including a plurality of spaced DNA spot images corresponding to a plurality of DNA spots, said image information including image intensity level information corresponding to said DNA spots;
means for selecting a set of image information within said frame including a selected set of the DNA spot images;
means for generating a grid including a plurality of spaced grid points corresponding to said selected DNA spot images, each grid point including position information indicating the position of the grid point within said frame;
means for modifying a current position of at least one grid point corresponding to a spot image in said selected image to shift said grid point toward the corresponding spot image;
means for segmenting the selected set of image information by selecting at least one image segment defining a segment area around a grid point and including a spot image with minimum distance from said grid point; and
means for quantifying at least a portion of image information in said image segment to obtain image characteristic values for said image segment;
wherein the image characteristic values include DNA information for a DNA spot corresponding to the DNA spot image in said image segment, said DNA information including gene expression values.

54. The computer system of claim 49, wherein: the means for relating and selecting include program instructions for associating each image characteristic value to a segment of a bar graph having multiple segments, and the means for displaying the selected graphic values include program instructions for displaying said segments as a bar graph, whereby each bar graph corresponds to a DNA spot.

55. The computer system of claim 54, further comprising means for selecting the area of each segment of each bar graph to be a function of the magnitude of the associated image characteristic value.

56. The computer system of claim 55, wherein the DNA spots have a predetermined spatial arrangement, and wherein the means for displaying further include program instructions for displaying the bar graphs in the same spatial arrangement, wherein each bar graph is displayed in the order of appearance of its corresponding DNA spot in said arrangement.

57. The computer system of claim 56 further including image generation means for generating said image characteristic values for one or more DNA spots, said image generation means including:
means for receiving a frame of image information including a plurality of spaced DNA spot images corresponding to a plurality of DNA spots, said image information including image intensity level information corresponding to said DNA spots;
means for selecting a set of image information within said frame including a selected set of the DNA spot images;
means for generating a grid including a plurality of spaced grid points corresponding to said selected DNA spot images, each grid point including position information indicating the position of the grid point within said frame;
means for modifying a current position of at least one grid point corresponding to a spot image in said selected image to shift said grid point toward the corresponding spot image;
means for segmenting the selected set of image information by selecting at least one image segment defining a segment area around a grid point and including a spot image with minimum distance from said grid point; and
means for quantifying at least a portion of image information in said image segment to obtain image characteristic values for said image segment;

wherein the image characteristic values include DNA information for a DNA spot corresponding to the DNA spot image in said image segment, said DNA information including gene expression values.

58. The computer system of claim 48, further including image generation means for generating said image characteristic values for one or more DNA spots, said image generation means including:
   means for receiving a frame of image information including a plurality of spaced DNA spot images corresponding to a plurality of DNA spots, said image information including image intensity level information corresponding to said DNA spots;
   means for selecting a set of image information within said frame including a selected set of the DNA spot images;
   means for generating a grid including a plurality of spaced grid points corresponding to said selected DNA spot images, each grid point including position information indicating the position of the grid point within said frame;
   means for modifying a current position of at least one grid point corresponding to a spot image in said selected image to shift said grid point toward the corresponding spot image;
   means for segmenting the selected set of image information by selecting at least one image segment defining a segment area around a grid point and including a spot image with minimum distance from said grid point; and
   means for quantifying at least a portion of image information in said image segment to obtain image characteristic values for said image segment;
   wherein the image characteristic values include DNA information for a DNA spot corresponding to the DNA spot image in said image segment, said DNA information including gene expression values.

59. The computer system of claim 48, wherein the image characteristic values comprise background and signal intensity levels, the computer system comprising:
   means for extracting said background and signal intensity levels from the image characteristic values for each DNA spot image; and
   means for determining difference values between the background intensity levels and signal intensity levels for each said DNA spot image;
   wherein:
      the means for relating relates the corresponding difference values to a range of graphic values;
      the means for selecting selects a graphic value for each difference value; and
      the means for displaying displays the selected graphic values.

60. The computer of claim 59, wherein said image information correspondent to a plurality of DNA spot image sets corresponding to a plurality of DNA spots, each image set including a plurality of DNA spot images corresponding to a DNA spot.

61. The computer system of claim 60, wherein: the means for relating and selecting include means for associating each difference value to a segment of a pie chart having multiple segments, and the means for displaying the selected graphic values include means for displaying said segments as a pie chart, whereby each pie chart corresponds to a DNA spot.

62. The computer system of claim 61, further comprising means for selecting the area of each segment of each pie chart to be a function of the magnitude of the associated difference value.

63. The computer system of claim 62, wherein the DNA spots have a predetermined spatial arrangement, and wherein the means for displaying further include means for displaying the pie charts in the same spatial arrangement, wherein each pie chart is displayed in the order of appearance of its corresponding DNA spot in said arrangement.

64. The computer system of claim 63, further comprising image generation means for generating said image characteristic values for one or more DNA spots, said image generation means including:
   means for receiving a frame of image information including a plurality of spaced DNA spot images corresponding to a plurality of DNA spots, said image information including image intensity level information corresponding to said DNA spots;
   means for selecting a set of image information within said frame including a selected set of the DNA spot images;
   means for generating a grid including a plurality of spaced grid points corresponding to said selected DNA spot images, each grid point including position information indicating the position of the grid point within said frame;
   means for modifying a current position of at least one grid point corresponding to a spot image in said selected image to shift said grid point toward the corresponding spot image;
   means for segmenting the selected set of image information by selecting at least one image segment defining a segment area around a grid point and including a spot image with minimum distance from said grid point; and
   means for quantifying at least a portion of image information in said image segment to obtain image characteristic values for said image segment;
   wherein the image characteristic values include DNA information for a DNA spot corresponding to the DNA spot image in said image segment, said DNA information including gene expression values.

65. The software system of claim 37, wherein: the means for relating and selecting include means for associating each difference value to a segment of a bar graph having multiple segments, and the means for displaying the selected graphic values include means for displaying said segments as a bar graph, whereby each bar graph corresponds to a DNA spot.

66. The computer system of claim 65, further comprising means for selecting the area of each segment of each bar graph to be a function of the magnitude of the associated difference value.

67. The computer system of claim 66, wherein the DNA spots have a predetermined spatial arrangement, and wherein the means for displaying further include program instructions for displaying the bar graphs in the same spatial arrangement, wherein each bar graph is displayed in the order of appearance of its corresponding DNA spot in said arrangement.

68. The computer system of claim 67, further comprising image generation means for generating said image characteristic values for one or more DNA spots, said image generation means including:
   means for receiving a frame of image information including a plurality of spaced DNA spot images corresponding to a plurality of DNA spots, said image information including image intensity level information corresponding to said DNA spots;
   means for selecting a set of image information within said frame including a selected set of the DNA spot images;
   means for generating a grid including a plurality of spaced grid points corresponding to said selected DNA spot images, each grid point including position information indicating the position of the grid point within said frame;

means for modifying a current position of at least one grid point corresponding to a spot image in said selected image to shift said grid point toward the corresponding spot image;

means for segmenting the selected set of image information by selecting at least one image segment defining a segment area around a grid point and including a spot image with minimum distance from said grid point; and means for quantifying at least a portion of image information in said image segment to obtain image characteristic values for said image segment;

wherein the image characteristic values include DNA information for a DNA spot corresponding to the DNA spot image in said image segment, said DNA information including gene expression values.

69. The computer system of claim 59, further comprising image generation means for generating said image characteristic values for one or more DNA spots, said image generation means including:

means for receiving a frame of image information including a plurality of spaced DNA spot images corresponding to a plurality of DNA spots, said image information including image intensity level information corresponding to said DNA spots;

means for selecting a set of image information within said frame including a selected set of the DNA spot images;

means for generating a grid including a plurality of spaced grid points corresponding to said selected DNA spot images, each grid point including position information indicating the position of the grid point within said frame;

means for modifying a current position of at least one grid point corresponding to a spot image in said selected image to shift said grid point toward the corresponding spot image;

means for segmenting the selected set of image information by selecting at least one image segment defining a segment area around a grid point and including a spot image with minimum distance from said grid point; and means for quantifying at least a portion of image information in said image segment to obtain image characteristic values for said image segment;

wherein the image characteristic values include DNA information for a DNA spot corresponding to the DNA spot image in said image segment, said DNA information including gene expression values.

* * * * *